United States Patent
Staczek

(10) Patent No.: US 8,087,855 B1
(45) Date of Patent: Jan. 3, 2012

(54) MULTI-FUNCTION DRILL PRESS SYSTEM

(76) Inventor: Roman Staczek, Seminole, FL (US)

( * ) Notice: Subject to any disclaimer, the term of this patent is extended or adjusted under 35 U.S.C. 154(b) by 0 days.

(21) Appl. No.: 13/066,673

(22) Filed: Apr. 21, 2011

(51) Int. Cl.
*B23B 39/00* (2006.01)

(52) U.S. Cl. ................ 408/87; 408/89; 408/91; 269/57; 269/63

(58) Field of Classification Search ........ 279/5; 408/87, 408/89–91, 103, 110–112; 269/69–70, 56–57, 269/63; 74/816, 813 L
See application file for complete search history.

(56) References Cited

U.S. PATENT DOCUMENTS

| | | | | |
|---|---|---|---|---|
| 1,201,050 A | * | 10/1916 | Huff | 408/136 |
| 2,369,425 A | * | 2/1945 | Becker | 269/85 |
| 2,471,940 A | * | 5/1949 | Dion | 408/89 |
| 2,649,819 A | * | 8/1953 | Hussey | 269/82 |
| 2,782,661 A | * | 2/1957 | Lewis | 269/55 |
| 2,923,179 A | * | 2/1960 | Pierce | 269/84 |
| 3,298,681 A | * | 1/1967 | Youngblood | 269/69 |
| 3,359,836 A | * | 12/1967 | Jalava | 408/89 |
| 5,544,988 A | * | 8/1996 | Liu | 408/90 |
| 5,547,319 A | * | 8/1996 | Pollak | 408/90 |
| 6,705,809 B2 | * | 3/2004 | Manos, Jr. | 408/89 |
| 7,857,556 B1 | * | 12/2010 | Staczek | 408/89 |

* cited by examiner

*Primary Examiner* — Daniel Howell

(57) ABSTRACT

A drill press has a housing, base and support shaft. The support shaft has a vertical first axis and a lower end supporting the base and an upper end supporting the housing. The housing includes a bit rotatable about a vertical second axis. A first lower plate is coupled to the support shaft. The connector is adjustable for varying the angular orientation of the first lower plate about a horizontal third axis. The first lower plate has an upper surface with a downwardly extending groove transverse to the third axis. A first upper plate has a lower surface with a downwardly extending projection slidable within the recess. A locking bolt is adapted to secure the upper plate with respect to the lower plate. The upper plate has an upper surface with a plurality of threaded apertures for securing a workpiece to be drilled.

3 Claims, 4 Drawing Sheets

MULTI-FUNCTION DRILL PRESS SYSTEM

BACKGROUND OF THE INVENTION

1. Field of the Invention

The present invention relates to a multi-function drill press system and more particularly pertains to supporting a workpiece at any of a plurality of angular attitudes, planar positions and rotational orientations with respect to a rotating drill bit.

2. Description of the Prior Art

The invention of the present application is an improvement over the invention disclosed and claimed in my prior patent, U.S. Pat. No. 7,857,556.

The use of drill press systems of known designs and configurations is known in the prior art. More specifically, drill press systems of known designs and configurations previously devised and utilized for the purpose of supporting workpieces are known to consist basically of familiar, expected, and obvious structural configurations, notwithstanding the myriad of designs encompassed by the crowded prior art which has been developed for the fulfillment of countless objectives and requirements.

While the known prior art devices fulfill their respective, particular objectives and requirements, they do not describe a multi-function drill press system that allows for supporting a workpiece at any of a plurality of angular attitudes, planar positions and rotational orientations with respect to a rotating drill bit.

In this respect, the multi-function drill press system according to the present invention substantially departs from the conventional concepts and designs of the prior art, and in doing so provides an apparatus primarily developed for the purpose of supporting a workpiece at any of a plurality of angular attitudes, planar positions and rotational orientations with respect to a rotating drill bit.

Therefore, it can be appreciated that there exists a continuing need for a new and improved multi-function drill press system which can be used for supporting a workpiece at any of a plurality of angular attitudes, planar positions and rotational orientations with respect to a rotating drill bit. In this regard, the present invention substantially fulfills this need.

SUMMARY OF THE INVENTION

In view of the foregoing disadvantages inherent in the known types of drill press systems of known designs and configurations now present in the prior art, the present invention provides an improved multi-function drill press system. As such, the general purpose of the present invention, which will be described subsequently in greater detail, is to provide a new and improved multi-function drill press system and method which has all the advantages of the prior art and none of the disadvantages.

To attain this, the present invention essentially comprises a multi function drill press system. The multi function drill press system supports a workpiece at any of a plurality of angular attitudes, planar positions, and rotational orientations with respect to a rotating drill bit. The supporting is done in a safe, convenient and economical manner.

First provided is a drill press having a housing, a base and a support shaft. The support shaft has a vertical first axis. The support shaft has a lower end supported by the base and an upper end supporting the housing. The housing includes a bit rotatable about a vertical second axis parallel with the first axis.

Provided next is a first lower plate. A connector couples the first lower plate to the support shaft. The connector is operator adjustable for varying the angular orientation of the first lower plate about a-horizontal third axis intersecting the first axis. The first lower plate has an upper surface with a downwardly extending rectilinear groove transverse to the third axis.

A first upper plate is next provided. The first upper plate has a lower surface with a downwardly extending rectilinear projection. The projection is slidable within the recess. A locking bolt is adapted to secure the position of the upper plate with respect to the lower plate. The upper plate has an upper surface with a plurality of threaded apertures for securing a workpiece to be drilled. The plurality of threaded apertures is an a linear array with a midpoint located beneath the drill bit.

A second lower plate is provided next. A connector 38 couples the second lower plate to the support shaft. The connector is operator adjustable for varying the angular of the second lower plate about a horizontal fourth axis intersecting the first axis. The lower plate has an upper central aperture and an upper surface with a plurality of rings. The rings include an inner ring with eight equally spaced recesses at a first radial distance from the central aperture. The rings include an intermediate ring with seventy two equally spaced recesses at a second radial distance from the central aperture. The rings include an outer ring with twelve equally spaced recesses at a third radial distance from the lower central aperture. The third radial distance is greater than the second radial distance. The second radial distance is greater than the first radial distance.

Lastly provided is a second upper plate. The second upper plate has an upper surface and a lower surface. An upper central aperture extends through the second upper plate. A pivot pin extends through the central apertures of the upper and lower plates for rotating the second upper plate with respect to the second lower plate with the lower surface of the second upper plate in facing contact with the upper surface of the second lower plate. An inner hole has a spring urged inner finger at the first radial distance. An intermediate hole has a spring urged intermediate finger at the second radial distance. An outer hole has a spring urged outer finger 66 at the third radial distance. Supplemental holes have spring urged supplemental fingers at a radial distance other than the first and second and third radial distances. The supplemental fingers are adapted to urge the second upper plate away from the second lower plate to facilitate rotation of the upper second plate with respect to the lower second plate.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved multi-function drill press system which has all of the advantages of the prior art drill press systems of known designs and configurations and none of the disadvantages.

It is another object of the present invention to provide a new and improved multi-function drill press system which may be easily and efficiently manufactured and marketed.

It is further object of the present invention to provide a new and improved multi-function drill press system which is of durable and reliable constructions.

An even further object of the present invention is to provide a new and improved multi-function drill press system which is susceptible of a low cost of manufacture with regard to both materials and labor, and which accordingly is then susceptible of low prices of sale to the consuming public, thereby making such multi-function drill press system economically available to the buying public.

Even still another object of the present invention is to provide a multi-function drill press system for supporting a workpiece at any of a plurality of angular attitudes, planar positions and rotational orientations with respect to a rotating drill bit.

Lastly, it is an object of the present invention to provide a new and improved drill press having a bit. A drill press has a housing, base and support shaft. The support shaft has a vertical first axis and a lower end supporting the base and an upper end supporting the housing. The housing includes a bit rotatable about a vertical second axis. A first lower plate is coupled to the support shaft. The connector is adjustable for varying the angular orientation of the first lower plate about a horizontal third axis. The first lower plate has an upper surface with a downwardly extending groove transverse to the third axis. A first upper plate has a lower surface with a downwardly extending projection slidable within the recess. A locking bolt is adapted to secure the upper plate with respect to the lower plate. The upper plate has an upper surface with a plurality of threaded apertures for securing a workpiece to be drilled.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
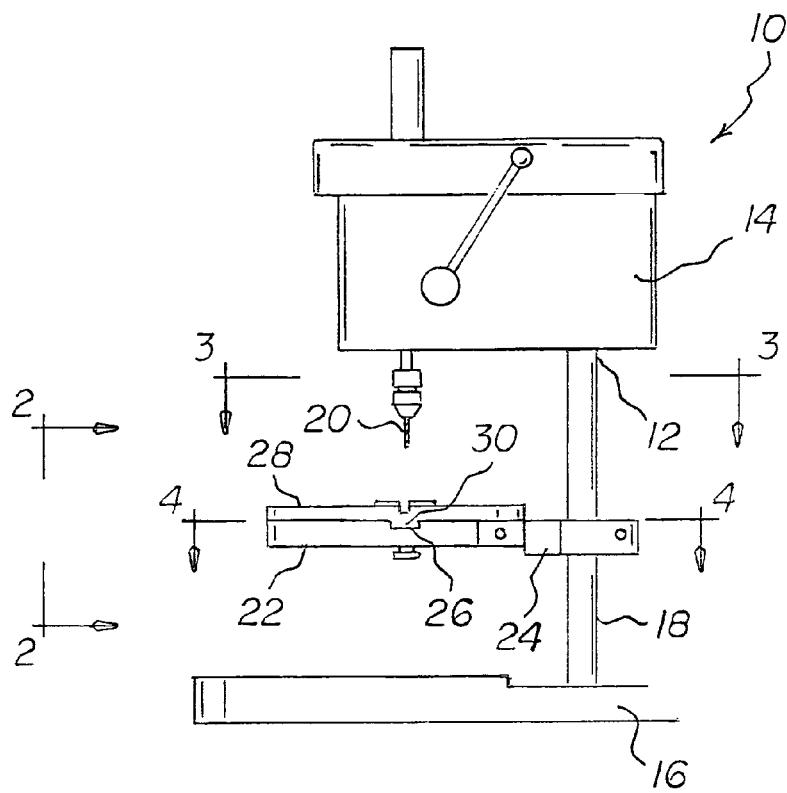
FIG. 1 is a side elevational view of a multi-function drill press system constructed in accordance with the principles of the present invention.
Figure 2:
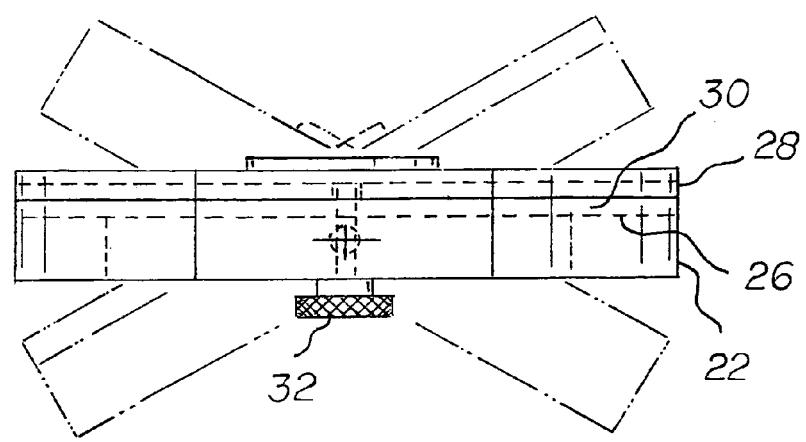
FIG. 2 is a front elevational view taken along line 2-2 of FIG. 1.
Figure 3:
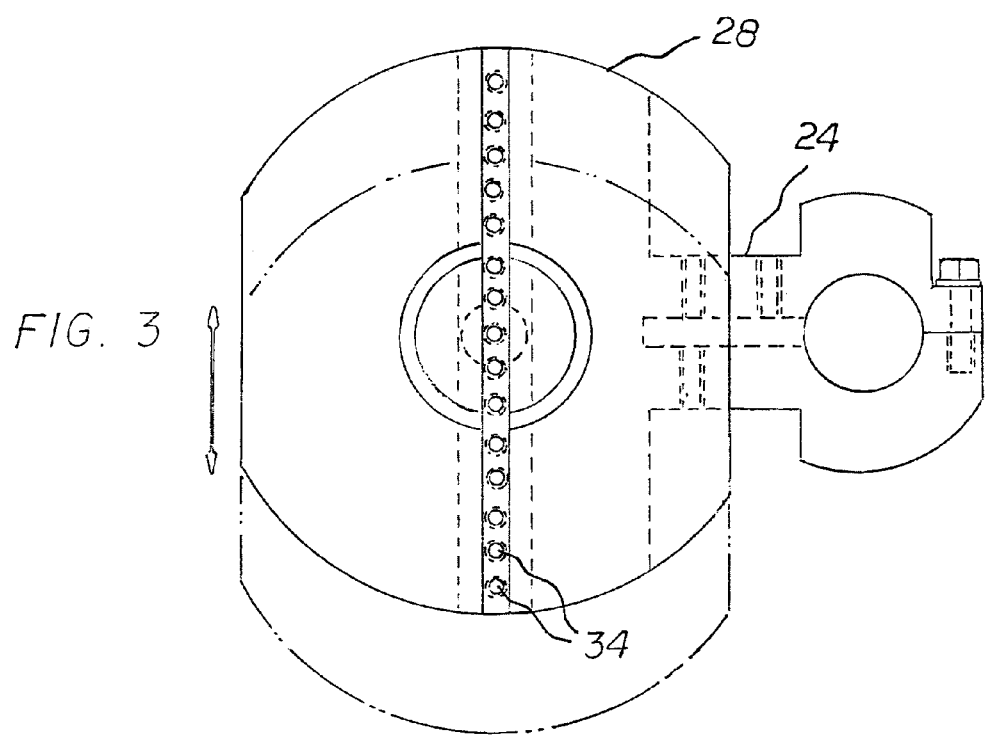
FIG. 3 is a plan view of a the upper plate and connector taken along line 3-3 of FIG. 1.
Figure 4:
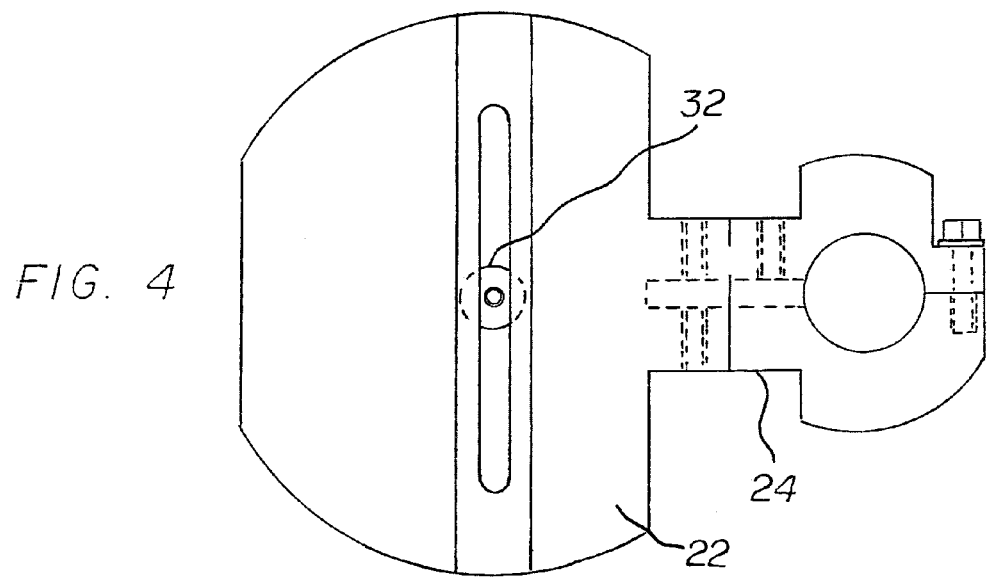
FIG. 4 is a plan view of a the lower plate and connector blocks taken along line 4-4 of FIG. 1.
Figure 5:
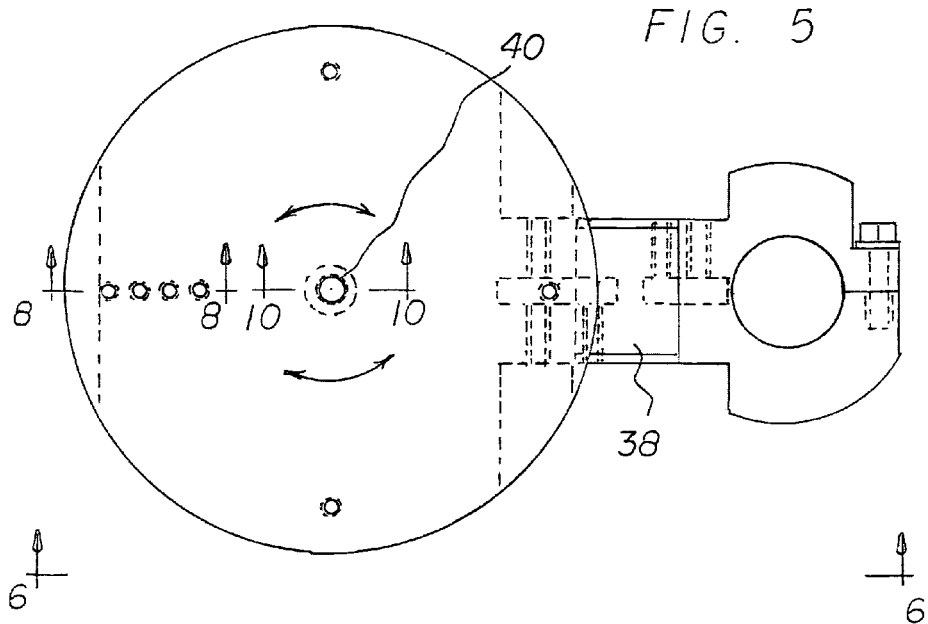
FIG. 5 is a plan view of a second plate assembly constructed in accordance with the principles of the present invention.
Figure 6:
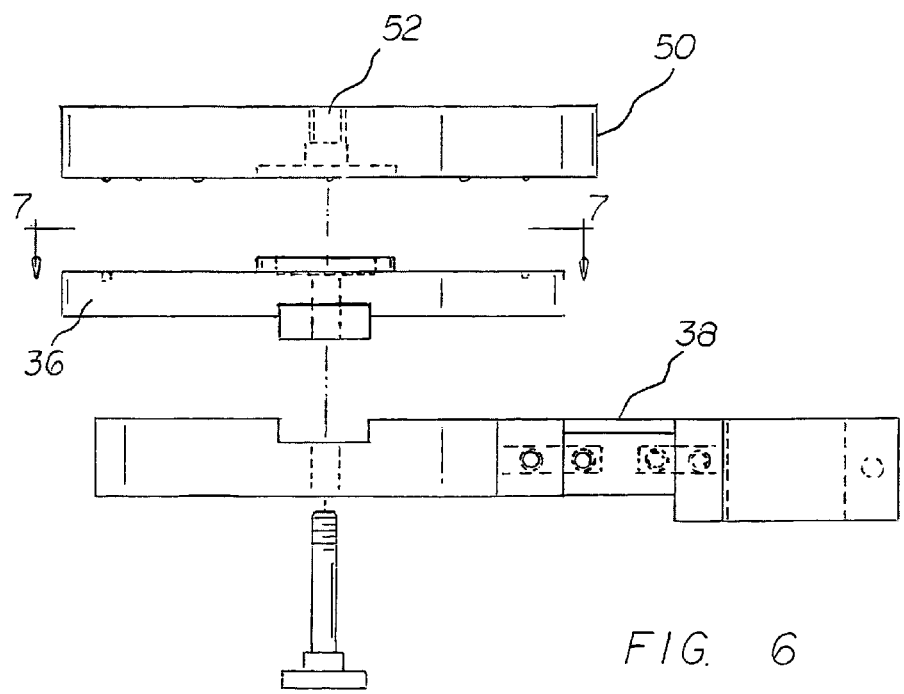
FIG. 6 is an exploded side elevational view taken along line 6-6 of FIG. 5.
Figure 7:
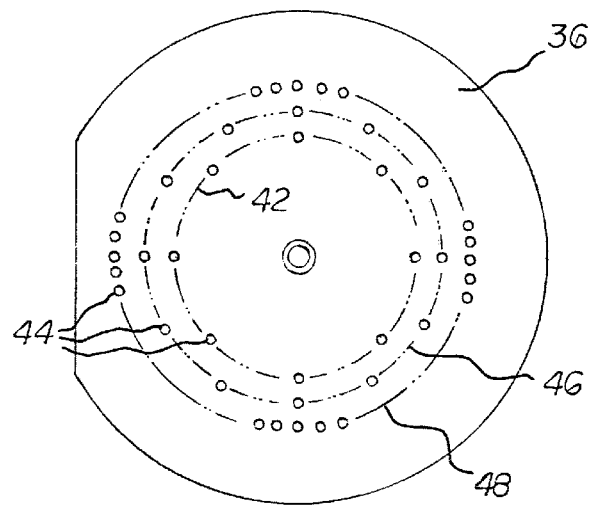
FIG. 7 is a plan view of the lower plate illustrated in FIGS. 5 and 6.
Figures 8, 9:
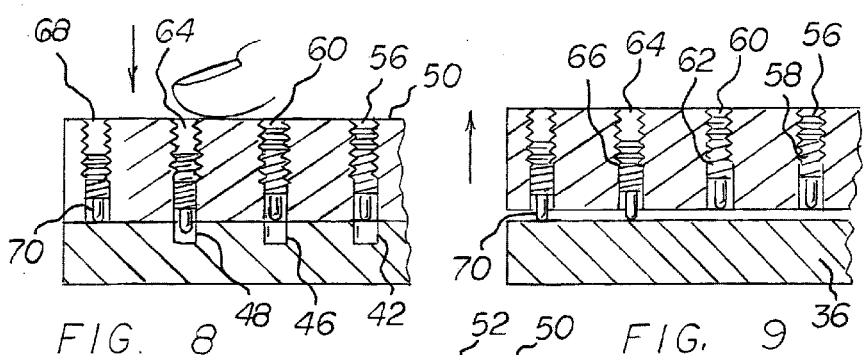
FIGS. 8, 9 and 10 are cross sectional views taken along lines 8-8, 9-9 and 10-10 of FIG. 5.
Figure 10:
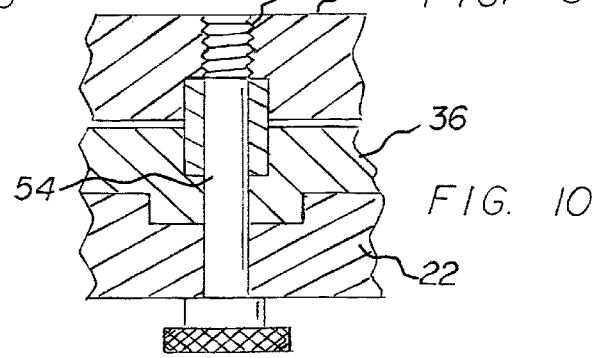

With reference now to the drawings, and in particular to FIG. 1 thereof, the preferred embodiment of the new and improved multi-function drill press system embodying the principles and concepts of the present invention and generally designated by the reference numeral 10 will be described.

The present invention, the multi-function drill press system 10 is comprised of a plurality of components. Such components in their broadest context include a drill press, a lower plate and an upper plate with aligned central apertures in the plates and with a pivot pin. Such components are individually configured and correlated with respect to each other so as to attain the desired objective.

The multi function drill press system 10 supports a workpiece at any of a plurality of angular attitudes, planar positions, and rotational orientations with respect to a rotating drill bit. The supporting is done in a safe, convenient and economical manner.

First provided is a drill press 12 having a housing 14, a base 16 and a support shaft 18. The support shaft has a vertical first axis. The support shaft has a lower end supported by the base and an upper end supporting the housing. The housing includes a bit 20 rotatable about a vertical second axis parallel with the first axis.

Provided next is a first lower plate 22. A connector 24 couples the first lower plate to the support shaft. The connector is operator adjustable for varying the angular orientation of the first lower plate about a horizontal third axis intersecting the first axis. The first lower plate has an upper surface with a downwardly extending rectilinear groove 26 transverse to the third axis.

A first upper plate 28 is next provided. The first upper plate has a lower surface with a downwardly extending rectilinear projection 30. The projection is slidable within the recess. A locking bolt 32 is adapted to secure the position of the upper plate with respect to the lower plate. The upper plate has an upper surface with a plurality of threaded apertures 34 for securing a workpiece to be drilled. The plurality of threaded apertures is an a linear array with a midpoint located beneath the drill bit.

A second lower plate 36 is provided next. A connector 38 couples the second lower plate to the support shaft. The connector is operator adjustable for varying the angular of the second lower plate about a horizontal fourth axis intersecting the first axis. The lower plate has an upper central aperture 40 and an upper surface with a plurality of rings. The rings include an inner ring 42 with eight equally spaced recesses 44 at a first radial distance from the central aperture. The rings include an intermediate ring 46 with seventy two equally spaced recesses at a second radial distance from the central aperture. The rings include an outer ring 48 with twelve equally spaced recesses at a third radial distance from the lower central aperture. The third radial distance is greater than the second radial distance. The second radial distance is greater than the first radial distance.

Lastly provided is a second upper plate 50. The second upper plate has an upper surface and a lower surface. An upper central aperture 52 extends through the second upper plate. A pivot pin 54 extends through the central apertures of the upper and lower plates for rotating the second upper plate with respect to the second lower plate with the lower surface of the second upper plate in facing contact with the upper surface of the second lower plate. An inner hole 56 has a spring urged inner finger 58 at the first radial distance. An intermediate hole 60 has a spring urged intermediate finger 62 at the second radial distance. An outer hole 64 has a spring urged outer finger 66 at the third radial distance. Supplemental holes (68) have spring urged supplemental fingers 70 at a radial distance other than the first and second and third radial distances. The supplemental fingers are adapted to urge the second upper plate away from the second lower plate to facilitate rotation of the upper second plate with respect to the lower second plate.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A multi function drill press system comprising:
 a drill press having a housing, base and support shaft, the support shaft having a vertical first axis and a lower end supporting the base and an upper end supporting the housing, the housing including a bit rotatable about a vertical second axis;
 a first lower plate coupled to the support shaft, a connector being adjustable for varying the angular orientation of the first lower plate about a horizontal third axis, the first lower plate having an upper surface with a downwardly extending groove transverse to the third axis; and
 a first upper plate having a lower surface with a downwardly extending projection slidable within the groove, a locking bolt adapted to secure the upper plate with respect to the lower plate, the upper plate having an upper surface with a plurality of threaded apertures for securing a workpiece to be drilled.

2. A multi function drill press system comprising:
 a drill press having a housing, a base and a support shaft, the support shaft having a vertical first axis, the support shaft having a lower end supported by the base and an upper end supporting the housing, the housing including a bit rotatable about a vertical second axis parallel with the first axis;
 a lower plate, a connector coupling the lower plate to the support shaft, the connector being operator adjustable for varying the angular orientation of the lower plate about a horizontal fourth axis intersecting the first axis, the lower plate having an upper central aperture and an upper surface with a plurality of rings, the rings including an inner ring with eight equally spaced recesses at a first radial distance from the central aperture, the rings including an intermediate ring with seventy two equally spaced recesses at a second radial distance from the central aperture, the rings including an outer ring with twelve equally spaced recesses at a third radial distance from the lower central aperture, the third radial distance being greater than the second radial distance, the second radial distance being greater than the first radial distance; and
 a upper plate, the upper plate having an upper surface and a lower surface, an upper central aperture through the upper plate, a pivot pin extending through the central apertures of the upper and lower plates for rotating the upper plate with respect to the lower plate with the lower surface of the upper plate in facing contact with the upper surface of the lower plate, an inner hole with a spring urged inner finger at the first radial distance, an intermediate hole with a spring urged intermediate finger at the second radial distance, an outer hole with a spring urged outer finger at the third radial distance, supplemental holes with spring urged supplemental fingers at a radial distance other than the first and second and third radial distances, the supplemental fingers adapted to urge the upper plate away from the lower plate to facilitate rotation of the upper plate with respect to the lower second plate.

3. A multi function drill press system (10) comprising:
 a drill press (12) having a housing (14), a base (16) and a support shaft (18), the support shaft having a vertical first axis, the support shaft having a lower end supported by the base and an upper end supporting the housing, the housing including a bit (20) rotatable about a vertical second axis parallel with the first axis;
 a first lower plate (22), a connector (24) coupling the first lower plate to the support shaft, the connector being operator adjustable for varying the angular orientation of the first lower plate about a horizontal third axis intersecting the first axis, the first lower plate having an upper surface with a downwardly extending rectilinear groove (26) transverse to the third axis;
 a first upper plate (28), the first upper plate having a lower surface with a downwardly extending rectilinear projection (30), the projection being slidable within the groove, a locking bolt (32) adapted to secure the position of the upper plate with respect to the lower plate, the upper plate having an upper surface with a plurality of threaded apertures (34) for securing a workpiece to be drilled, the plurality of threaded apertures being an a linear array with a midpoint located beneath the drill bit;
 a second lower plate (36), a connector (38) coupling the second lower plate to the support shaft, the connector being operator adjustable for varying the angular orientation of the second lower plate about a horizontal fourth axis intersecting the first axis, the lower plate having an upper central aperture (40) and an upper surface with a plurality of rings, the rings including an inner ring (42) with eight equally spaced recesses (44) at a first radial distance from the central aperture, the rings including an intermediate ring (46) with seventy two equally spaced recesses at a second radial distance from the central aperture, the rings including an outer ring (48) with twelve equally spaced recesses at a third radial distance from the lower central aperture, the third radial distance being greater than the second radial distance, the second radial distance being greater than the first radial distance; and a second upper plate (50), the second upper plate having an upper surface and a lower surface, an upper central aperture (52) through the second upper plate, a pivot pin (54) extending through the central apertures of the upper and lower plates for rotating the second upper plate with respect to the second lower plate with the lower surface of the second upper plate in facing contact with the upper surface of the second lower plate, an inner hole (56) with a spring urged inner finger (58) at the first radial distance, an intermediate hole (60) with a spring urged intermediate finger (62) at the second radial distance, an outer hole (64) with a spring urged outer finger (66) at the third radial distance, supplemental holes (68) with spring urged supplemental fingers (70) at a radial distance other than the first and second and third radial distances, the supplemental fingers adapted to urge the second upper plate away from the second lower plate to facilitate rotation of the upper second plate with respect to the lower second plate.

* * * * *